US009600101B2

(12) United States Patent
Trenholm-Boyle et al.

(10) Patent No.: US 9,600,101 B2
(45) Date of Patent: Mar. 21, 2017

(54) INTERACTIVE INPUT SYSTEM, INTERACTIVE BOARD THEREFOR AND METHODS

(71) Applicant: SMART Technologies ULC, Calgary (CA)

(72) Inventors: Michael Trenholm-Boyle, Calgary (CA); Roberto Sirotich, Calgary (CA); Joe Wright, Calgary (CA); Daniel P. McReynolds, Calgary (CA); Tim Schanne, Calgary (CA); Stanley Tarng, Calgary (CA); Evan Ross, Calgary (CA); Warren Barkley, Calgary (CA); Neil Gaydon, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 115 days.

(21) Appl. No.: 14/231,154

(22) Filed: Mar. 31, 2014

(65) Prior Publication Data

US 2015/0277586 A1    Oct. 1, 2015

(51) Int. Cl.
*G06F 3/038*    (2013.01)
*G06F 3/042*    (2006.01)
(Continued)

(52) U.S. Cl.
CPC .......... *G06F 3/0383* (2013.01); *G06F 3/0308* (2013.01); *G06F 3/0325* (2013.01); *G06F 3/03542* (2013.01); *G06F 3/03545* (2013.01); *G06F 3/0421* (2013.01); *G06F 3/0428* (2013.01); *G06F 3/04812* (2013.01); *G06F 3/04817* (2013.01); *G06F 3/04842* (2013.01);
(Continued)

(58) Field of Classification Search
CPC .. G06F 3/0428; G06F 3/03542; G06F 3/0421; G06F 3/03545
See application file for complete search history.

(56) References Cited

U.S. PATENT DOCUMENTS

| | | |
|---|---|---|
| 5,448,263 A | 9/1995 | Martin |
| 6,141,000 A | 10/2000 | Martin |
| (Continued) | | |

FOREIGN PATENT DOCUMENTS

| | | |
|---|---|---|
| EP | 2 637 076 A2 | 9/2013 |
| WO | 2011085479 A1 | 7/2011 |
| WO | 2013/104053 A1 | 7/2013 |

OTHER PUBLICATIONS

Extended European Search Report for European Patent Application No. 15 16 0138, mailed Aug. 11, 2015.

*Primary Examiner* — Larry Sternbane
*Assistant Examiner* — Sepehr Azari
(74) *Attorney, Agent, or Firm* — Perkins Coie LLP

(57) ABSTRACT

An interactive board comprises an interactive surface; at least one user selectable element; and processing structure in communication with at least one imaging device and configured to process data received from said at least one imaging device to locate at least one pointer positioned in proximity with said interactive surface and update digital ink according to pointer location, said processing structure being further configured to send said digital ink to one or more devices in communication with the interactive board in response to selection of said at least one user selectable element.

25 Claims, 11 Drawing Sheets

(51) Int. Cl.
    *G06F 3/0481*     (2013.01)
    *G06F 3/0354*     (2013.01)
    *G06F 3/0484*     (2013.01)
    *G06F 3/0488*     (2013.01)
    *G06F 3/03*     (2006.01)
    *H04W 4/00*     (2009.01)

(52) U.S. Cl.
    CPC .............. *G06F 3/04883* (2013.01); *G06F 2203/04106* (2013.01); *G06F 2203/04108* (2013.01); *G06F 2203/04807* (2013.01); *H04W 4/008* (2013.01)

(56) References Cited

U.S. PATENT DOCUMENTS

| | | |
|---|---|---|
| 6,337,681 B1 | 1/2002 | Martin |
| 6,747,636 B2 | 6/2004 | Martin |
| 6,803,906 B1 | 10/2004 | Morrison et al. |
| 7,232,986 B2 | 6/2007 | Worthington et al. |
| 7,236,162 B2 | 6/2007 | Morrison et al. |
| 7,274,356 B2 | 9/2007 | Ung et al. |
| 2008/0151314 A1 | 6/2008 | Nisihiie |
| 2009/0309841 A1 | 12/2009 | Wilson et al. |
| 2011/0169727 A1 | 7/2011 | Akitt |
| 2012/0235934 A1* | 9/2012 | Kawasaki ........... G06F 3/03545 345/173 |
| 2012/0261548 A1 | 10/2012 | Utukuri et al. |
| 2013/0086487 A1* | 4/2013 | Findlay .................... H04N 7/15 715/753 |
| 2013/0198653 A1* | 8/2013 | Tse ....................... G06F 3/0484 715/751 |

\* cited by examiner

INTERACTIVE INPUT SYSTEM, INTERACTIVE BOARD THEREFOR AND METHODS

FIELD

The subject disclosure relates generally to an interactive input system, an interactive board therefor and methods.

BACKGROUND

Interactive input systems that allow users to inject input (i.e. digital ink, mouse events etc.) into an application program using an active pointer (e.g. a pointer that emits light, sound or other signal), a passive pointer (e.g. a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the disclosures of which are incorporated herein by reference; touch systems comprising touch panels employing electromagnetic, capacitive, acoustic or other technologies to register pointer input; laptop and tablet personal computers (PCs); personal digital assistants (PDAs) and other handheld devices; and other similar devices.

For example, above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports imaging devices in the form of digital cameras at its corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

Improvements in interactive input systems are generally desired. It is therefore an object at least to provide a novel interactive input system, interactive board therefor and methods.

SUMMARY OF THE INVENTION

Accordingly, in one aspect there is provided an interactive board comprising: an interactive surface; at least one user selectable element; and processing structure in communication with at least one imaging device and configured to process data received from the at least one imaging device to locate at least one pointer positioned in proximity with the interactive surface and update digital ink according to pointer location, the processing structure being further configured to send the digital ink to one or more devices in communication with the interactive board in response to selection of the at least one user selectable element.

The interactive surface may be dry-erase marker ink compatible and the digital ink may generally correspond with dry-erase marker ink on the interactive surface. The interactive board may further comprise one or more pen tools with each pen tool configured to apply dry-erase marker ink to the interactive surface. Each pen tool may be configured to provide illumination when applying the dry-erase marker ink to the interactive surface. The processing structure may be configured, upon detecting illumination provided by a pen tool at a pointer location, to generate digital ink corresponding to the pointer location. The processing structure may be configured, upon detecting no illumination provided by a pointer at a pointer location, to erase digital ink corresponding to the pointer location. The interactive board may further comprise a tool tray for supporting each pen tool.

The processing structure may be configured to send the digital ink to a printer for printing, to a USB storage device for storage, or to both in response to selection of the at least one user selectable element.

The interactive board may further comprise a control bar that comprises a plurality of user selectable elements, each user selectable element being associated with a different function such as, for example, power, printing, storage and data transmission functions. The control bar may be located on the interactive surface or on frame structure surrounding the interactive surface such as a bezel or tool tray.

The processing structure may be configured to communicate with one or more wireless computing devices over a wireless communication session. The processing structure may be configured, during the wireless communication session, to automatically send digital ink to one or more wireless computing devices. The processing structure may be configured, during the wireless communication session, to continuously send digital ink to one or more wireless computing devices. The interactive board may further comprise at least one of a quick response (QR) code label and a near field communication (NFC) label encoding wireless link information. The wireless link information may be usable by each wireless computing device for establishing the wireless communication session with the processing structure.

In another aspect, there is provided a non-transitory computer-readable medium storing instructions which, when executed by one or more processors, cause an interactive board at least to process data received from at least one imaging device to locate at least one pointer positioned in proximity with an interactive surface; update digital ink according to pointer location; and when a user selectable element of the interactive board is selected, send the digital ink to one or more devices in communication with the interactive board.

In another aspect, there is provided a wireless computing device comprising memory storing instructions and one or more processors communicating with the memory and executing the instructions to cause the wireless computing device at least to: process information on an interactive board to obtain wireless link information; establish a wireless communication session with the interactive board using the wireless link information; and display digital ink received from said interactive board over said wireless communication session on a display.

In another aspect there is provided an interactive input system comprising an interactive board as described above and one or more wireless computing devices. At least one of the one or more wireless computing devices may be configured to forward digital ink to at least one of a networked device and a cloud storage service. The at least one of the one or more wireless computing devices may be configured to automatically send digital ink at periodic intervals to the networked device, to the cloud storage service, or to both.

BRIEF DESCRIPTION OF THE DRAWINGS

Embodiments will now be described more fully with reference to the accompanying drawings in which.

DETAILED DESCRIPTION OF EMBODIMENTS

Figure 1:
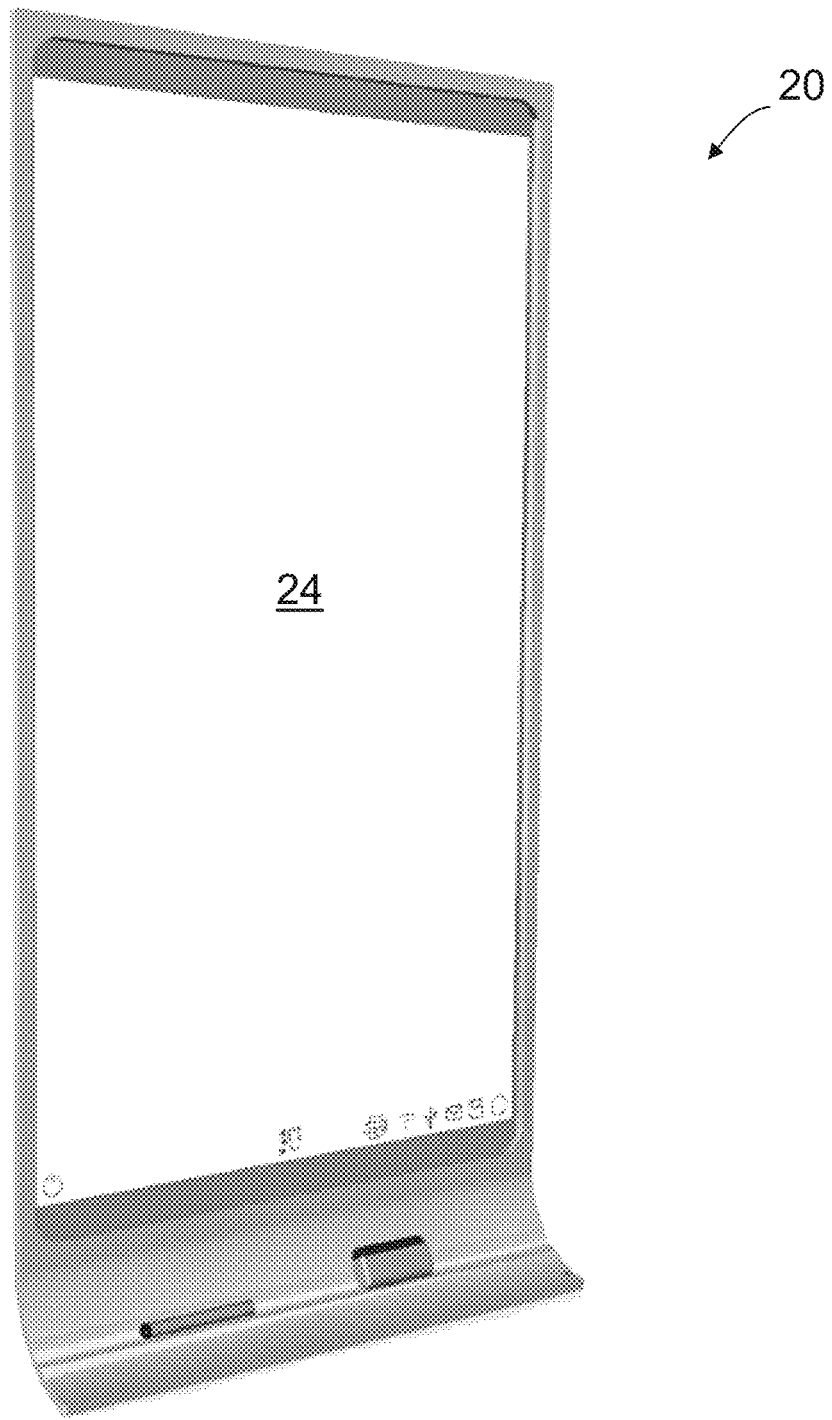
FIG. 1 is a perspective view of an interactive board.
Figure 2A:
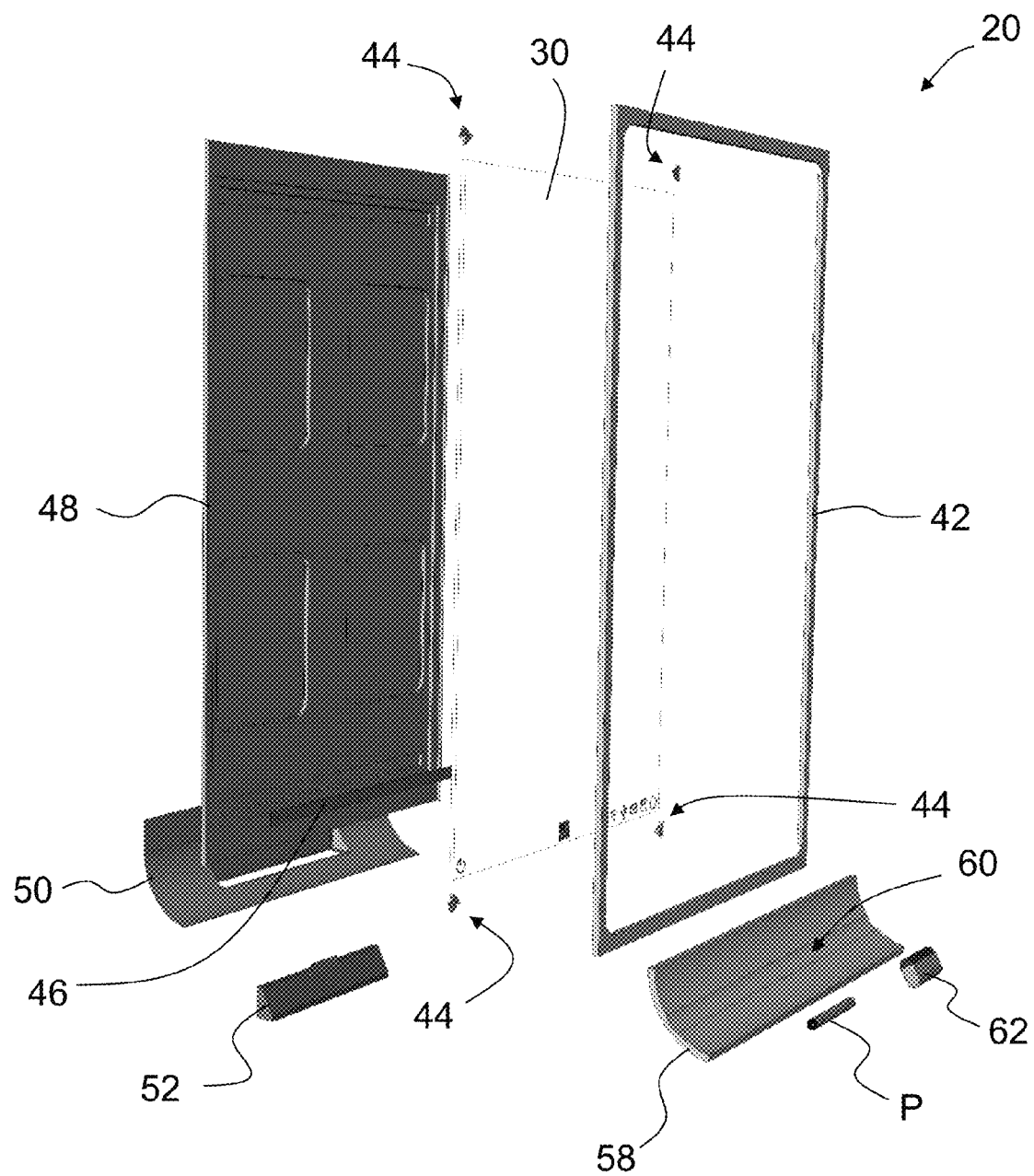
FIGS. 2a and 2b are exploded front and rear perspective views, respectively, of the interactive board of FIG. 1.
Figure 2B:
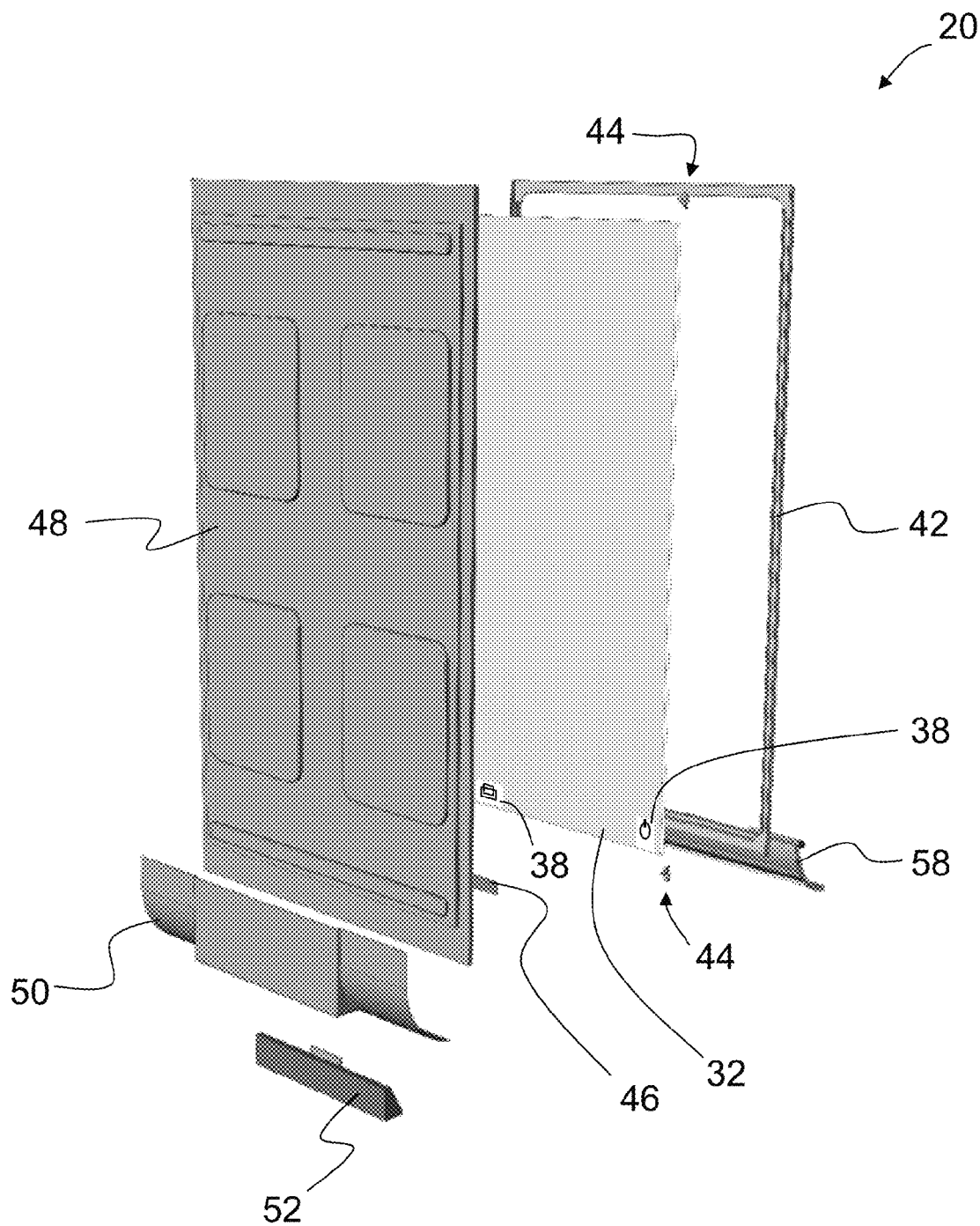

Turning now to FIG. 1, an interactive board that allows a user to inject input such as digital ink, mouse events etc. into an executing application program is shown and is generally identified by reference numeral 20. In this embodiment, interactive board 20 is mounted on a vertical support surface such as for example, a wall surface or the like or is otherwise supported or suspended in a generally upright orientation. Interactive board 20 comprises a generally planar, rectangular interactive surface 24 and employs machine vision to detect one or more pointers brought into a region of interest in proximity with the interactive surface 24. The interactive board 20 executes one or more application programs allowing pointer activity proximate to the interactive surface 24 to be recorded as writing or drawing or used to control execution of one or more executing application programs.

Figure 3:
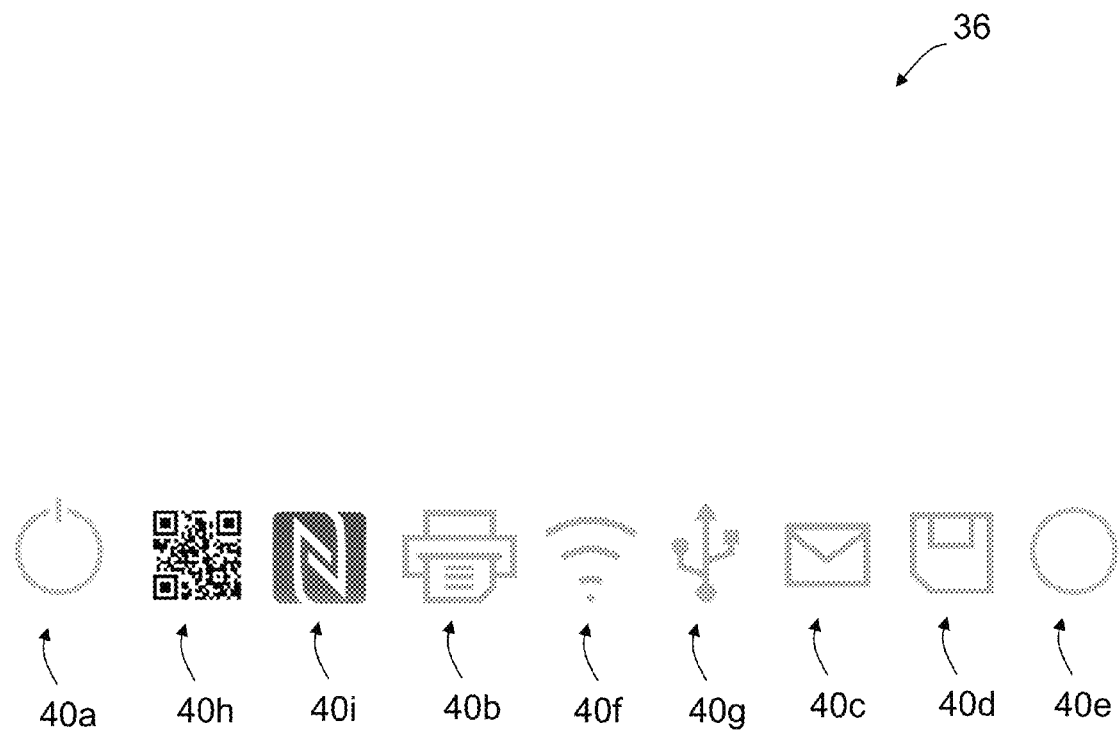
FIG. 3 is a front view of user selectable controls of a control bar forming part of the interactive board of FIG. 1.
Figure 4:
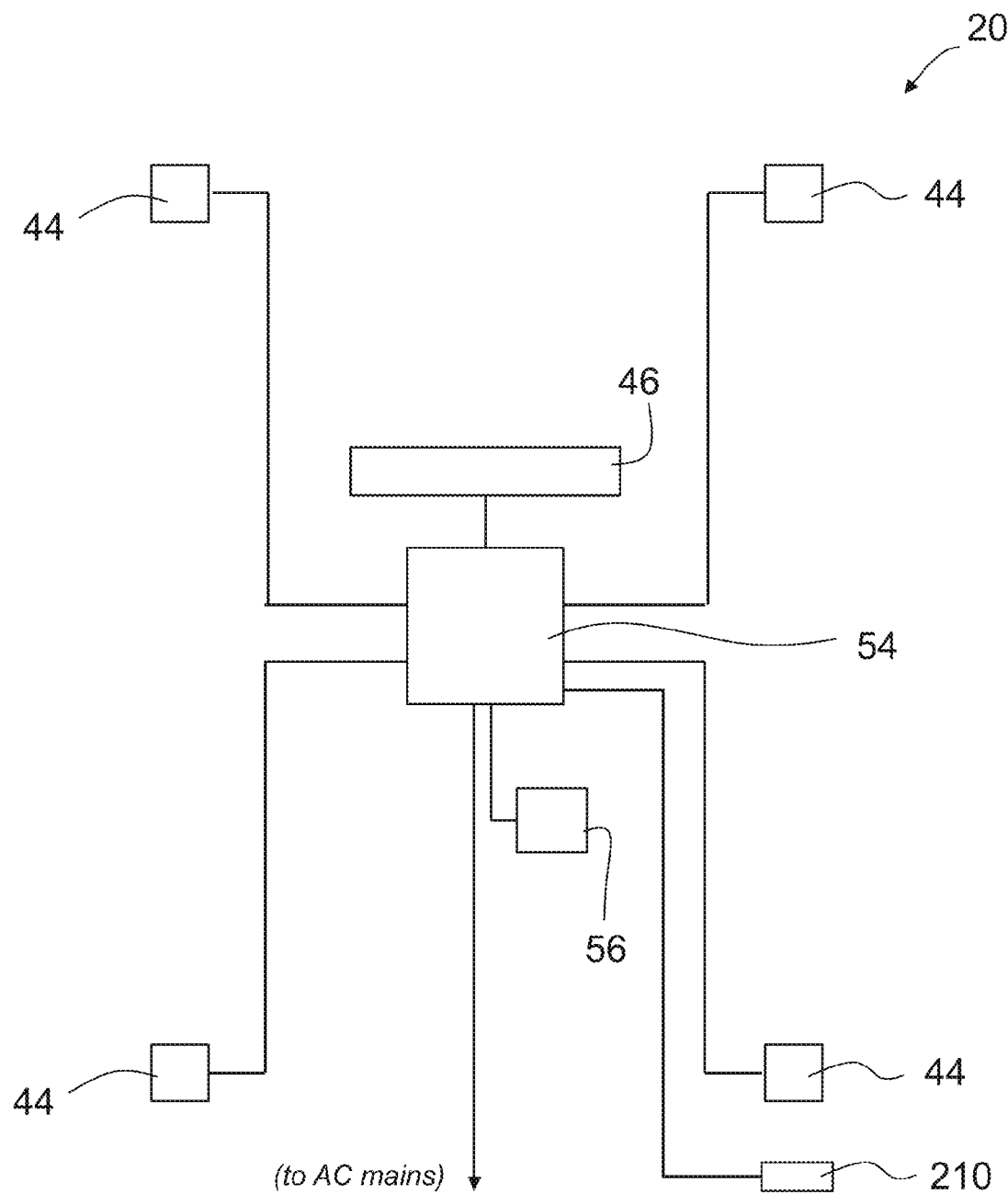
FIG. 4 is a block diagram of the interactive board of FIG. 1.

FIGS. 1 to 4 better illustrate the interactive board 20. As can be seen, interactive board 20 comprises a generally planar front panel 30 having a front surface defining the interactive surface 24. The front surface of panel 30 is dry-erase marker ink compatible. In this manner, dry-erase marker ink can be applied to and erased from the interactive surface 24 during use. The front panel 30 is fabricated of generally transparent material such as glass, plexi-glass, plastic etc. and has a rear surface on which an opaque layer 32 is applied. In this embodiment, opaque layer 32 is a layer of white-coloured paint although other suitable materials may be used. An elongate control bar is provided adjacent the bottom of the interactive surface 24 and comprises a plurality of user selectable elements in the form of icons generally identified by reference numeral 36. As is best illustrated in FIG. 3, the icons 36 of the control bar comprise a power on/off icon 40a, a print icon 40b, an email icon 40c, a save icon 40d, a system status icon 40e, a wireless connection icon 40f, a universal serial bus (USB) device connection icon 40g, a quick response (QR) code label 40h and a near field communication (NFC) label 40i. In this embodiment, the power on/off icon 40a, print icon 40b, email icon 40c, save icon 40d, system status icon 40e, wireless connection icon 40f and USB device connection icon 40 are printed either on the front or rear surface of the front panel 30 at locations corresponding to windows 38 provided in the opaque layer 32. The QR code label 40h and NFC label 40i are printed, adhered or otherwise applied to the front surface of the front panel 30.

A bezel 42 surrounds the periphery of the front panel 30. In the embodiment shown, the bezel 42 has four (4) bezel segments that extend around the edges of the interactive surface 24. The bezel 42 accommodates imaging assemblies 44, with each imaging assembly 44 being positioned adjacent a different corner of the bezel. The imaging assemblies 44 are oriented so that their fields of view overlap and look generally across the entire interactive surface 24. In this manner, any pointer such as for example a user's finger, a cylinder, a pen tool or erase tool that is brought into proximity with the interactive surface 24 appears in the fields of view of the imaging assemblies 44.

An elongate illumination source 46 is mounted behind the front panel 30 in registration with the control bar. In this embodiment, the illumination source 46 is a full color, light emitting device (LED) flat panel display and is configured to illuminate the icons 36 of the control bar.

The front panel 30 and elongate illumination source 46 are fastened to a rear support panel 48. The rear support panel 48 is formed of a suitable structural material such as metal, plastic etc. and in this embodiment is configured to be hung on a bracket (not shown) mounted to the wall surface. A curved lower console 50 is fastened or otherwise secured to the bottom of the rear support panel 48. The lower console 50 has a receptacle that is configured to accommodate an electronics module 52 housing a master controller 54 and a general purpose computing device 56.

A curved tool tray 58 is disposed on the lower console 50. The tool tray 58 is configured to support a plurality of tools for use with the interactive board 20. In particular, the tool tray 58 has a slot 60 that is sized to receive one or more active pen tools P and an eraser tool 62 that can be used to interact with the interactive surface 24. The curved profile of the lower console 50 and tool tray 58 gives the interactive board 20 a sleek appearance.

Figure 5:
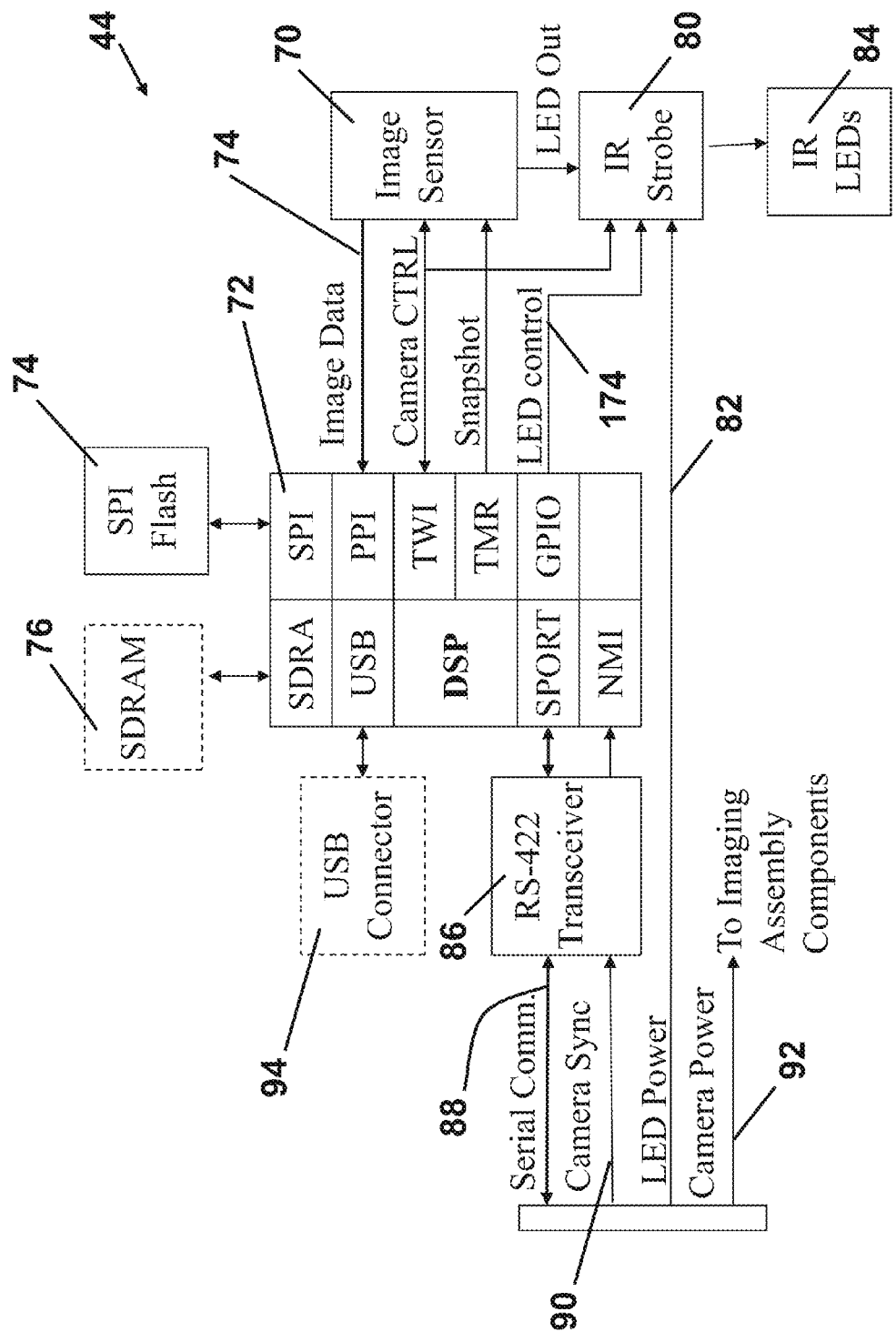
FIG. 5 is a block diagram of an imaging assembly forming part of the interactive board of FIG. 1.

Turning now to FIG. 5, one of the imaging assemblies 44 is better illustrated. As can be seen, the imaging assembly 44 comprises an image sensor 70 such as that manufactured by Aptina (Micron) of San Jose, Calif. under part number MT9V034 having a resolution of 752×480 pixels and that is fitted with a two element, plastic lens (not shown) providing the image sensor 70 with a field of view of approximately 104 degrees. In this manner, the other imaging assemblies 44 are within the field of view of the image sensor 70 thereby to ensure that the field of view of the image sensor 70 encompasses the entire interactive surface 24.

A digital signal processor (DSP) 72 such as that manufactured by Analog Devices of Norwood, Mass. under part number ADSP-BF522 Blackfin or other suitable processing device, communicates with the image sensor 70 over an image data bus 74 via a parallel port interface (PPI). A serial peripheral interface (SPI) flash memory 74 is connected to the DSP 72 via an SPI port and stores the firmware required for image assembly operation. Depending on the size of captured image frames as well as the processing requirements of the DSP 72, the imaging assembly 44 may optionally comprise synchronous dynamic random access memory (SDRAM) 76 to store additional temporary data as shown by the dotted lines. The image sensor 70 also communicates with the DSP 72 via a two-wire interface (TWI) and a timer (TMR) interface. The control registers of the image sensor 70 are written from the DSP 72 via the TWI in order to configure parameters of the image sensor 70 such as the integration period for the image sensor 70.

In this embodiment, the image sensor 70 operates in snapshot mode. In the snapshot mode, the image sensor 70, in response to an external trigger signal received from the DSP 72 via the TMR interface that has a duration set by a timer on the DSP 72, enters an integration period during which an image frame is captured. Following the integration period after generation of the trigger signal by the DSP 72 has ended, the image sensor 70 enters a readout period during which time the captured image frame is available. With the image sensor in the readout period, the DSP 72 reads the image frame data acquired by the image sensor 70 over the image data bus 74 via the PPI. The frame rate of the image sensor 70 in this embodiment is between about 900 and about 960 frames per second. The DSP 72 in turn processes image frames received from the image sensor 72 and provides pointer information to the master controller 56 at a reduced rate of approximately 120 points/sec. Those of skill in the art will however appreciate that other frame rates may be employed depending on the desired accuracy of pointer tracking and whether multi-touch and/or active pointer identification is employed.

Strobe circuits 80 communicate with the DSP 72 via the TWI and via a general purpose input/output (GPIO) interface. The strobe circuits 80 also communicate with the image sensor 70 and receive power provided on power line 82. Each strobe circuit 80 drives a respective illumination source in the form of an infrared (IR) light source. In this embodiment, each IR light source comprises one or more IR light emitting diodes (LEDs) 84 that provide infrared backlighting over the interactive surface 24 during image capture. The strobe circuits 80 are further described in U.S. Patent Application Publication No. 2011/0169727 to Akitt entitled "INTERACTIVE INPUT SYSTEM AND ILLUMINATION SYSTEM THEREFOR", filed on Feb. 19, 2010, the relevant portions of the disclosure of which are incorporated herein by reference.

The DSP 72 also communicates with an RS-422 transceiver 86 via a serial port (SPORT) and a non-maskable interrupt (NMI) port. The transceiver 86 communicates with the master controller 54 over a differential synchronous signal (DSS) communication link 88 and a synch line 90. Power for the components of the imaging assembly 44 is provided on power line 92. DSP 72 may also optionally be connected to a USB connector 94 via a USB port as indicated by the dotted lines. The USB connector 94 can be used to connect the imaging assembly 44 to diagnostic equipment.

Figure 6:
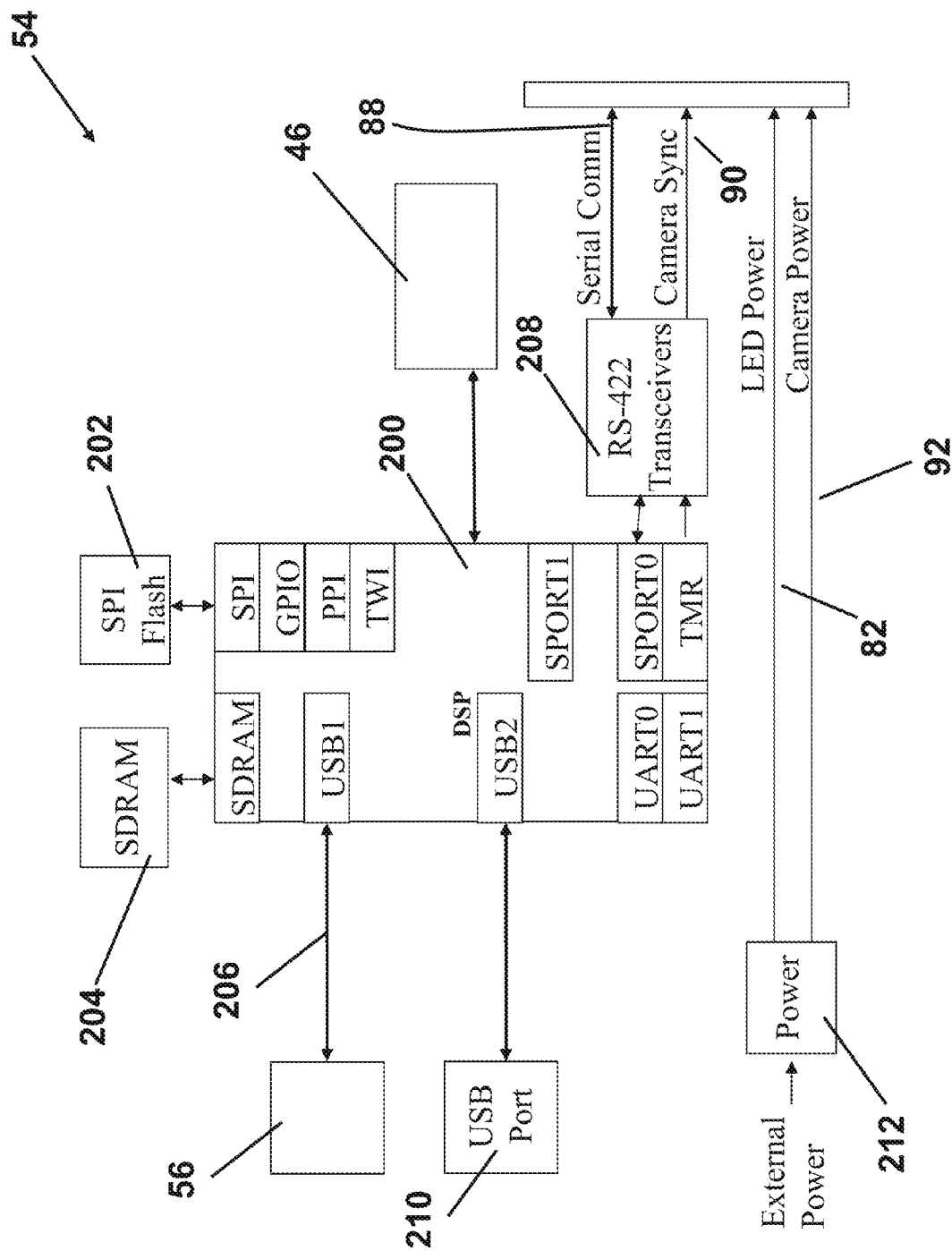
FIG. 6 is a block diagram of a master controller forming part of the interactive board of FIG. 1.

Turning now to FIG. 6, the master controller 54 is better illustrated. As can be seen, master controller 54 comprises a DSP 200 such as that manufactured by Analog Devices of Norwood, Massachusetts under part number ADSP-BF522 Blackfin or other suitable processing device. A serial peripheral interface (SPI) flash memory 202 is connected to the DSP 200 via an SPI port and stores the firmware required for master controller operation. A synchronous dynamic random access memory (SDRAM) 204 that stores temporary data necessary for system operation is connected to the DSP 200 via an SDRAM port. The DSP 200 communicates with the general purpose computing device 56 over a USB cable 206 via a first USB port. The DSP 200 communicates with an external DSP port 210 via a second USB port and communicates with the elongate illumination source 46. The DSP 200 communicates through its serial port (SPORT0) with the imaging assemblies 44 via an RS-422 transceiver 208 over the differential synchronous signal (DSS) communications link 88. In this embodiment, as more than one imaging assembly 44 communicates with the master controller DSP 200 over the DSS communications link 88, time division multiplexed (TDM) communications is employed. The DSP 200 also communicates with the imaging assemblies 44 via the RS-422 transceiver 208 over the camera synch line 90. A power adapter 212 provides the necessary operating power to the interactive board 20 when connected to a conventional AC mains power supply.

As will be appreciated, the architectures of the imaging assemblies 44 and master controller 54 are similar. By providing a similar architecture between each imaging assembly 44 and the master controller 54, the same circuit board assembly and common components may be used for both thus reducing the part count and cost of the interactive board 20. Differing components are added to the circuit board assemblies during manufacture dependent upon whether the circuit board assembly is intended for use in an imaging assembly 44 or in the master controller 54. For example, the master controller 54 may require a SDRAM 76 whereas the imaging assembly 44 may not.

The general purpose computing device 56 in this embodiment is a suitable processing device comprising, for example, a processing unit comprising one or more processors, system memory (volatile and/or non-volatile memory), other non-removable or removable memory (e.g. a hard disk drive, RAM, ROM, EEPROM, CD-ROM, DVD, flash memory, etc.) and a system bus coupling the various computing device components to the processing unit. The general purpose computing device 56 is configured for wireless communication with one or more wireless computing devices over Bluetooth and Wi-Fi wireless protocols. The general purpose computing device 56 is also configured for wired communication for accessing shared or remote drives, one or more networked computers, one or more networked printers, or other networked devices.

Figure 7:
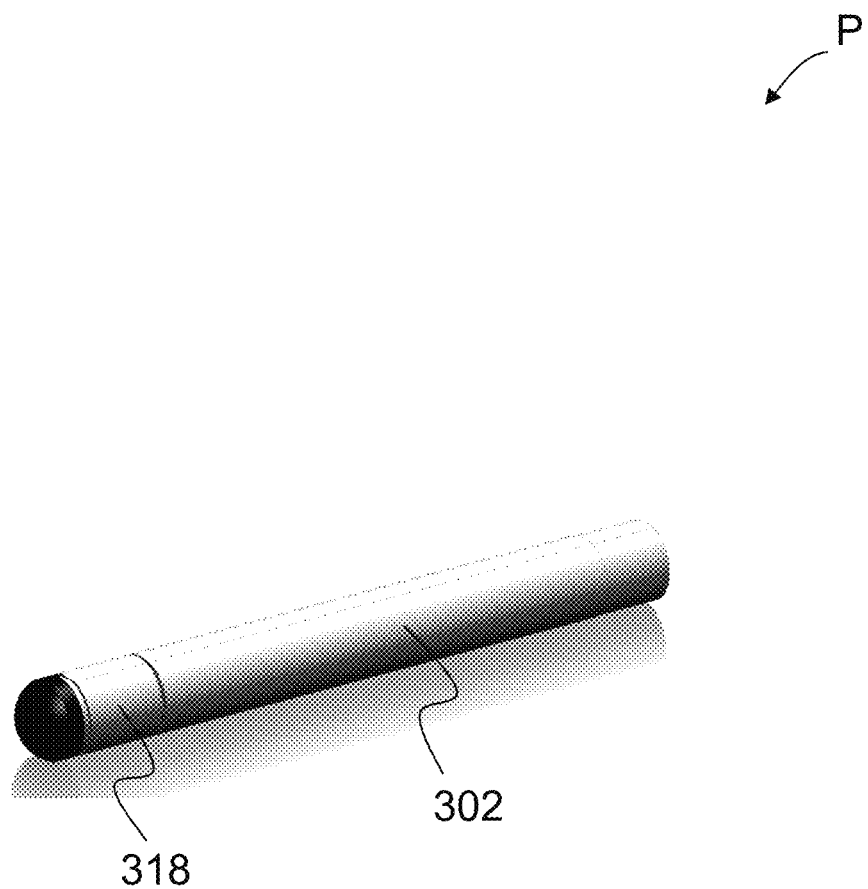
FIG. 7 is a perspective view of an active pen tool for use with the interactive board of FIG. 1.
Figure 8:
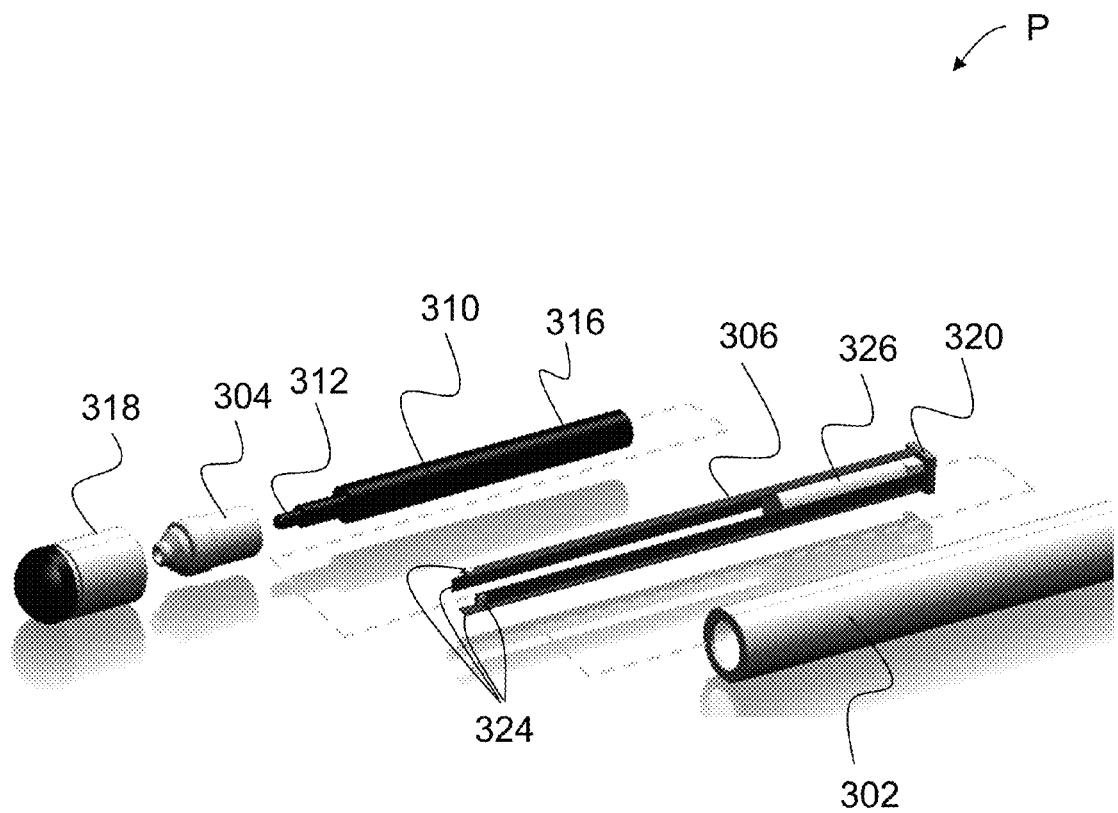
FIG. 8 is an exploded perspective view of the active pen tool of FIG. 7.
Figure 9:
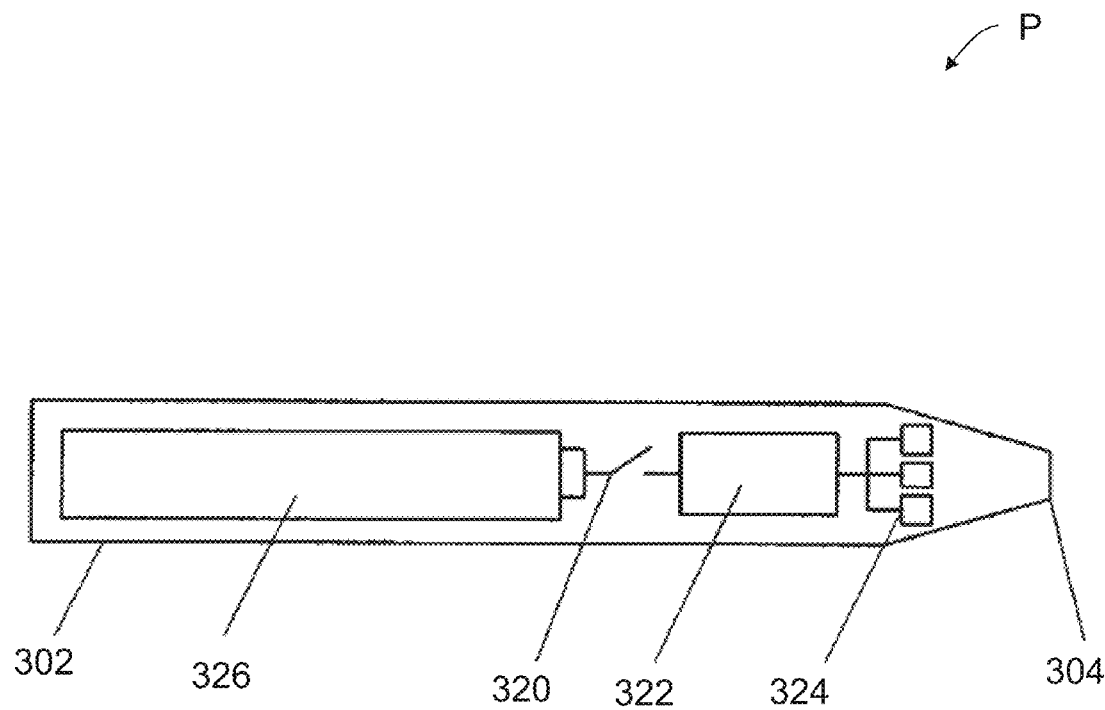
FIG. 9 is a side schematic block diagram of the active pen tool of FIG. 7.

FIGS. 7 to 9 show an active pen tool P for use with the interactive board 20. The pen tool P comprises a hollow body 302 having a tip 304 disposed at one end thereof. The tip 304 has an aperture extending therethrough. An actuator assembly 306 is housed within the body 302 adjacent the tip 304. Accommodated within the actuator assembly 306 is an ink dispenser 310 that is moveable relative to the actuator assembly 306. The ink dispenser 310 comprises a felt nib 312 in fluid communication with an ink reservoir 316 that holds dry-erase marker ink. The nib 312 is configured to wick dry-erase marker ink from the ink reservoir 316 and apply the dry-erase marker ink onto a surface, such as interactive surface 24, with which the nib 312 is in contact. The ink dispenser 310 is accommodated within the actuator assembly 306 such that the nib 312 protrudes through the aperture in the tip 304. The nib 312 is biased out of the tip 304 by a spring (not shown) acting on the ink dispenser 310, but can be pushed back into the tip 304 against the bias of the spring upon application of pressure thereto. The active pen tool P also comprises a removable cap 318 that is shaped to cover the tip 304 and the protruding nib 312, for example when the pen tool P is not in use.

The actuator assembly 306 comprises an actuator switch 320 that is triggered when pressure is applied to the ink dispenser 310 as a result of contact between the nib 312 and the interactive surface 24 that exceeds an activation threshold resulting in the nib 312 being pushed into the tip 304. The actuator assembly 306 also comprises a printed circuit board (not shown) having a microcontroller 322 thereon. An illumination source adjacent the tip 304 is connected to the microcontroller 322 and is configured to illuminate when powered. In this embodiment, the illumination source comprises four (4) infrared light emitting diodes (LEDs) 324. Power to the printed circuit board is provided by a power source 326 which, in the embodiment shown, comprises one or more chargeable or non-chargeable batteries. The power source 326 is coupled to the printed circuit board via the actuator switch 320.

When the nib 312 of the pen tool P is brought into contact with the interactive surface 24 with a force exceeding the activation threshold, the nib 312 is pushed into the tip 304 resulting in the ink dispenser 310 moving inwardly relative to the actuator assembly 306 and the actuator switch 320 being triggered. As a result, power from the power source 326 is supplied to the printed circuit board. In response, the microcontroller 322 drives the LEDs 324 causing the LEDs to turn on and provide continuous infrared illumination to the tip 304.

During operation of the interactive board 20, the DSP 200 of the master controller 54 outputs synchronization signals that are applied to the synch line 90 via the transceiver 208. Each synchronization signal applied to the synch line 90 is received by the DSP 72 of each imaging assembly 44 via transceiver 86 and triggers a non-maskable interrupt (NMI) on the DSP 72. In response to the non-maskable interrupt triggered by the synchronization signal, the DSP 72 of each imaging assembly 44 ensures that its local timers are within system tolerances and if not, corrects its local timers to match the master controller 54. Using one local timer, the DSP 72 initiates a pulse sequence via the snapshot line that is used to condition the image sensor to the snapshot mode and to control the integration period and frame rate of the image sensor 70 in the snapshot mode. The DSP 72 also initiates a second local timer that is used to provide output on the LED control line 174 so that the IR LEDs 84 are properly powered during the image frame capture cycle.

In response to the pulse sequence output on the snapshot line, the image sensor 70 of each imaging assembly 44 acquires image frames at the desired image frame rate. In this manner, image frames captured by the image sensor 70 of each imaging assembly can be referenced to the same point of time allowing the position of pointers brought into the fields of view of the image sensors 70 to be accurately triangulated. Each imaging assembly 44 has its own local oscillator (not shown) and synchronization signals are distributed so that a lower frequency synchronization signal (e.g. the point rate, 120 Hz) for each imaging assembly 44 is used to keep image frame capture synchronized. By distributing the synchronization signals for the imaging assemblies 44, rather than, transmitting a fast clock signal to each image assembly 44 from a central location, electromagnetic interference is reduced.

For each operation cycle of the image sensor 70, the image sensor is conditioned to capture a pair of image frames. The first image frame of the pair is captured with the IR LEDs 84 turned on and the second image frame is captured with the IR LEDs 84 turned off. The image frames that are captured with the IR LEDs 84 turned on are processed to detect pointer interaction with interactive surface 24 using a finger or other passive pointer such as eraser tool 62. The image frames that are captured with the IR LEDs 84 turned off are processed to detect pointer interaction with interactive surface 24 using an active pen tool P.

In particular, when the IR LEDs 84 are on, the IR LEDs flood the region of interest over the interactive surface 24 with infrared illumination Infrared illumination that impinges on the bezel segments is reflected by reflective or retro-reflective surfaces of the bezel segments and returned to the imaging assemblies 44. As a result, the image sensor 70 of each imaging assembly 44 sees a bright band having a substantially even intensity over its length, together with any ambient light artifacts. When a passive pointer is in proximity with the interactive surface 24 and the IR LEDs 84 are on, the passive pointer occludes infrared illumination reflected by the bezel segments. As a result, the image sensor 70 of each imaging assembly 44 sees a dark region that interrupts the bright band in captured image frames allowing the existence of the passive pointer to be detected. When an active pen tool P is in contact with the interactive surface 24, such that the nib 312 is brought into contact with the interactive surface 24 with a force exceeding the activation threshold, and the IR LEDs 84 are on, infrared illumination provided by the tip 304 of the active pen tool P generally blends with the infrared illumination provided by the IR LEDs 84 that is reflected by the bezel segments back to the imaging assemblies 44. As a result, the image sensor 70 of each imaging assembly 44 sees the bright band and the existence of the active pen tool P remains undetected.

When the IR light sources 82 are off, no infrared illumination impinges on the bezel segments. Consequently, the image sensor 70 of each imaging assembly 44 does not see the bezel segments and does not see any passive pointer in proximity with the interactive surface 24. Each imaging assembly 44 does however see artifacts resulting from ambient light on a dark background. When an active pen tool P is brought into contact with the interactive surface 24, such that the nib 312 is brought into contact with the interactive surface 24 with a force exceeding the activation threshold, the image sensor 70 of each imaging assembly 44 sees a bright region corresponding to illumination emitted from the active pen tool P on an otherwise dark background.

The sequence of image frames captured by the image sensor 70 of each imaging assembly 44 is processed by the DSP 72 to identify each pointer in each image frame and to obtain contact information as described in PCT Application Publication No. WO 2011/085479 to McGibney et al. entitled "INTERACTIVE INPUT SYSTEM AND ILLUMINATION SYSTEM THEREFOR", filed on Jan. 14, 2011, the relevant portions of the disclosure of which are incorporated herein by reference. The DSP 72 of each imaging assembly 44 in turn conveys the resultant pointer data to the DSP 200 of the master controller 54. The DSP 200 uses the resultant pointer data received from the DSPs 72 to calculate the position of each pointer relative to the interactive surface 24 in (x,y) coordinates using well known triangulation as described in above-incorporated U.S. Pat. No. 6,803,906 to Morrison. This pointer coordinate data along with pointer type and pointer contact status data is conveyed to the general purpose computing device 56.

The general purpose computing device 56 executes an application that controls illumination of the illumination source 46, and that allows digital ink corresponding to pointer interaction with the interactive surface 24 to be temporarily stored and to be sent to other devices in communication with the interactive board 20. In this embodiment, pointer contacts on the interactive surface 24 at locations other than the control bar that are made using the active pen tool P are treated as writing events. As a result, pointer coordinate data generated in response to the pointer contacts made on the interactive surface 24 with the active pen tool P are converted into digital ink that corresponds with the dry-erase marker ink applied to the interactive surface 24 by the nib 312 of the active pen tool P and stored. Pointer contacts on the interactive surface 24 at locations other than the control bar that are made using a passive pointer, such as the eraser tool 62, are treated as erasing events. As a result, pointer coordinate data generated in response to the pointer contacts made on the interactive surface 24 with the passive pointer are used to erase stored digital ink that corresponds to the pointer coordinate data. Pointer contacts on the interactive surface 24 at locations corresponding to the control bar that are made using either the active pen tool P or a passive pointer are used to invoke functions. The nature of the illumination output by illumination source 46 is dependent on pointer interaction with the control bar.

The power on/off icon 40a of the control bar is selectable to allow a user to control the power mode of the interactive board 20. In particular, when the power on/off icon 40a of the control bar is selected in response to pointer contact on the interactive surface 24, the general purpose computing device 56 toggles the interactive board 20 between power on and power off modes. When the interactive board 20 is conditioned to the power off mode, no power is supplied to the general purpose computing device 56 or to the imaging assemblies 44. The DSP 200 of the master controller 54 however, conditions the illumination source 46 to illuminate the system status icon 40e with red light signifying the interactive board power off condition. When the interactive board 20 is conditioned to the power on mode, power is supplied to the entire interactive board 20. The DSP 200 in turn conditions the illumination source 46 to illuminate the system status icon 40e with green light. Also, when the power on/off icon 40a is selected, the DSP 200 conditions the illumination source 46 to illuminate the power on/off icon 40a with blue light for a predetermined time interval. In this embodiment, the time interval is one (1) second.

With the interactive board 20 in the power on mode, when the print icon 40b of the control bar is selected in response to pointer input on the interactive surface 24, the general purpose computing device 56 sends the stored digital ink to a printer in communication with the interactive board 20 for printing. The DSP 200 conditions the illumination source 46 to illuminate the print icon 40b with blue light for a predetermined time interval. In this embodiment, the time interval is one (1) second.

With the interactive board 20 in the power on mode, if the general purpose computing device 56 is currently storing one or more designated email addresses, the DSP 200 conditions the illumination source 46 to illuminate the email icon 40c with green light signifying that the email icon 40c is available for selection. If no designated email address is stored by the general purpose computing device 56, the email icon 40c is not illuminated signifying that the email icon 30c is not available for selection. When the "green" email icon 40c of the control bar is selected in response to pointer contact on the interactive surface 24, the general purpose computing device 56 sends the stored digital ink to the one or more designated email addresses stored in the general purpose computing device 56. Designated email addresses are entered through text recognition of writing events input via active pen tool P on the interactive surface 24. In this embodiment, input of the character "@" prompts the general purpose computing device 56 to recognize input writing events as a designated email address. Also when the email icon 40c is selected, the DSP 200 conditions the illumination source 46 to illuminate the email icon 40c with blue light for a predetermined time interval. In this embodiment, the time interval is one (1) second.

With the interactive board 20 in the power on mode, when a USB storage device is connected to external DSP port 210, the DSP 200 conditions the illumination source 46 to illuminate the USB device connection icon 40g with green light signifying that the save icon 40d is available for selection. When no USB storage device is connected to external DSP port 210, the USB device connection icon 40g is not illuminated signifying that the save icon 40d is unavailable for selection. When the save icon 40d is illuminated and is selected in response to pointer input on the interactive surface 24, the general purpose computing device 56 saves the stored digital ink on the USB storage device connected to external DSP port 210. The DSP 200 also conditions the illumination source 46 to illuminate the save icon 40d with blue light for a predetermined time interval. In this embodiment, the time interval is one (1) second. The general purpose computing device 56 also sends the stored digital ink to one or more designated networked devices, if any, that are in communication with the general purpose computing device 56 through a network, such as for example a Local Area Network (LAN), an Ethernet, the Internet or a combination of different networks.

Figure 10:
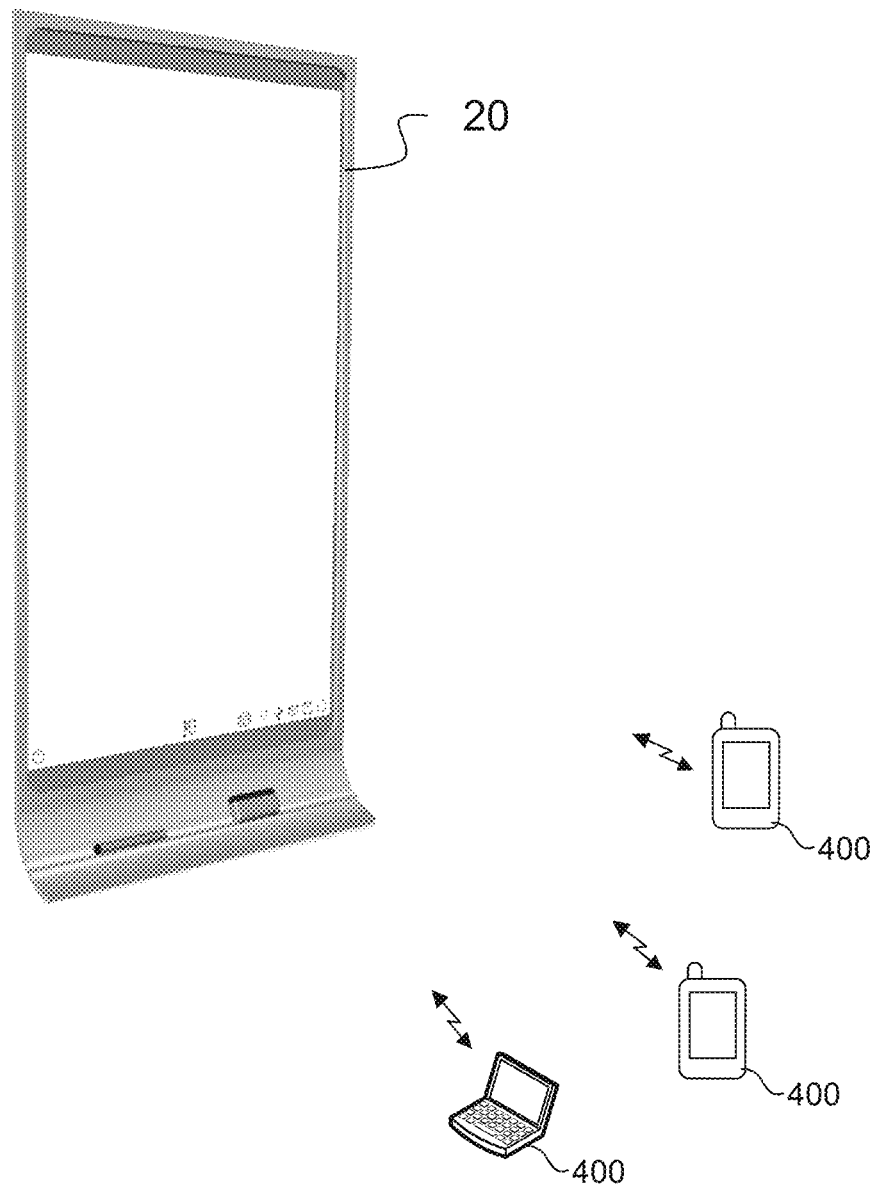
FIG. 10 is a perspective view of the interactive board of FIG. 1 in communication with one or more wireless computing devices.

The application executed on the general purpose computing device 56 also allows the stored digital ink to be sent automatically to one or more wireless computing devices 400 that have established a wireless communication session with the general purpose computing device 56 of the interactive board 22 as shown in FIG. 10. In this embodiment, each wireless computing device may be either a personal computer, a laptop computer, a notebook computer, a tablet computer, a personal digital assistant (PDA), a cellular phone, a smartphone etc. A wireless computing device 400 may establish a wireless communication session with the general purpose computing device 56 in one of several ways.

If the wireless computing device 400 is equipped with a camera, a wireless communication session can be established by using the camera of the wireless computing device to scan the QR code label 40h. The QR code label 40h encodes a uniform resource locator (URL) having embedded wireless link information. The wireless link information comprises a Wi-Fi media access control (MAC) address of the general purpose computing device 56, and a Bluetooth MAC address of the general purpose computing device 56. As will be understood and is known, the operating system running on the wireless computing device 400 automatically utilizes an image processing application to decode the scanned QR code label 40h and obtain the URL. The wireless computing device 400 then launches a wireless communication application installed on the wireless computing device and directs it to establish a wireless communication session with the general purpose computing device 56 using the wireless link information. If a wireless communication application has not been installed on the wireless computing device 400, the wireless computing device automatically opens a browser window displaying an Internet webpage prompting the user to download and install the wireless communication application from the webpage onto the wireless computing device. The HTTP address for the webpage is contained in the URL encoded in the QR code label 40h.

If the wireless computing device 400 is equipped with a near-field communication (NFC) sensor, a wireless communication session can be established by positioning the wireless computing device in proximity with the NFC label 40i. The NFC label 40i similarly encodes an URL having embedded wireless link information. The wireless link information comprises the Wi-Fi MAC and Bluetooth MAC addresses of the general purpose computing device 56. As will be understood, the operating system running on the wireless computing device automatically utilizes an NFC communication application to decode the URL. The wireless computing device 400 then launches the wireless communication application installed thereon and directs it to establish a wireless communication session with the general purpose computing device 56 using the wireless link information. If the wireless communication application has not been installed on the wireless computing device, the wireless computing device 400 automatically opens a browser window displaying an Internet webpage prompting the user to download and install the wireless communication application from the webpage onto the wireless computing device. The Hypertext Transfer Protocol (HTTP) address for the webpage is contained in the URL encoded in the NFC label 40i.

The wireless communication session may utilize either the Wi-Fi wireless protocol or the Bluetooth wireless protocol. Once a wireless communication session between the general purpose computing device 56 and one or more wireless computing device 400 has been established, the DSP 200 conditions the illumination source 46 to illuminate the wireless connection icon 40f with green light. When no wireless communication session is established, the wireless connection icon 40f is not illuminated.

During the wireless communication session, stored digital ink is continuously sent by the general purpose computing device 56 to each wireless computing device 400 connected to the wireless communication session, where it can be displayed dynamically in a window of the wireless communication application running thereon. In this manner, and as will be understood, writing events and erasing events, corresponding with interaction between one or more active pen tools P and/or one or more passive pointers, such as eraser tool 62, and the interactive surface 24, are displayed in "real time" on each wireless computing device.

The wireless communication application provides a function menu allowing the user of the wireless computing device to save the digital ink displayed in the wireless communication application window at any time as a digital ink file. When the save function has been selected, the user is prompted to specify the file format of the digital ink file, such as for example JPEG, PDF, MS Word document, and the like. When saving a digital ink file in MS Word document format, the wireless communication application processes the digital ink using an optical character recognition (OCR) engine and converts any digital ink recognized as text to digital text, which is saved together with any digital ink not recognized as text in the file. The function menu also provides an email function that allows the user to send the digital ink file in an email to one or more email addresses specified by the user. The function menu further provides an automatic cloud storage function which, when enabled by the user, causes the wireless computing device 400 to automatically send a digital ink file at periodic time intervals to an address of a cloud storage system for storage. In this embodiment, periodic time interval is one (1) second. The function menu further provides an automatic networked device forward function which, when enabled by the user, causes the wireless computing device 400 to automatically send a digital ink file at periodic time intervals to a network address of a network device for any of viewing and storage. In this embodiment, periodic time interval is one (1) second.

As will be appreciated, by establishing a wireless communication session with one or more wireless computing devices that are configured to send a digital ink file at periodic time intervals to an address of a cloud storage system or a network address of a network device, the interactive board 20 may be operated independently of any wired network connection and in a "stand-alone" manner. As will be understood, this advantageously allows the interactive board 20 to be installed and operated at generally any location, regardless of network connection availability, while allowing digital ink to be recorded and stored elsewhere.

Although the control bar is described as comprising user selectable elements in the form of icons printed or otherwise displayed on the front panel 30, those of skill in the art will appreciate that alternatives are available. For example, the icons may be presented by the illumination source 46. Alternatively, the control bar may comprise icons printed on a capacitive touch surface or touch surface employing another touch sensing technology that is incorporated into the tool tray or bezel. Of course, the control bar may comprise an array of physical buttons positioned on the tool tray or bezel.

Those of skill in the art will appreciate that the icon illumination colours and illumination intervals described above are exemplary and that other illumination colour schemes and intervals may be employed. Also, the control bar may comprise additional or fewer user selectable elements.

Although the interactive board is described and shown as comprising imaging assemblies at its corners, those of skill in the art will appreciate that more or fewer imaging assemblies may be employed and positioned at various locations about the interactive surface. Also, the interactive surface need not take an upright orientation. The interactive surface may be inclined or may be horizontal. Furthermore, if desired, the master controller 54 and general purpose computing device 56 may be embodied in a single processing device. Those of skill in the art will also appreciate that the interactive board may communicate with wireless computing devices using other wireless protocols.

Although embodiments have been described above with reference to the accompanying drawings, those of skill in the art will appreciate that variations and modifications may be made without departing from the scope thereof as defined by the appended claims.

What is claimed is:

1. An interactive board comprising:
    an interactive surface;
    at least one imaging device;
    at least one illumination source proximate the periphery of said interactive surface;
    at least one user selectable element; and
    processing structure in communication with the at least one imaging device and the at least one illumination source, the processing structure configured to process data received from said at least one imaging device to locate at least one pointer positioned in proximity with said interactive surface and update digital ink according to pointer location,
    wherein— the at least one imaging device is configured to capture a first image frame and a second image frame within an operation cycle, the first image frame is captured with the at least one illumination source turned on, the second image frame is captured with the at least one illumination source turned off, after detecting illumination provided by the at least one pointer at the pointer location within the second image frame, the processing structure updates the digital ink by generating digital ink corresponding to the pointer location;

after detecting no illumination provided by the at least one pointer at the pointer location within the first image frame, the processing structure updates the digital ink by erasing digital ink corresponding to the pointer location; and said processing structure being further configured to send said digital ink to one or more devices in communication with the interactive board in response to selection of said at least one user selectable element.

2. The interactive board of claim 1, wherein the interactive surface is dry-erase marker ink compatible.

3. The interactive board of claim 2, wherein the digital ink corresponds with dry-erase marker ink on the interactive surface.

4. The interactive board of claim 2, further comprising: one or more pen tools, each pen tool configured to apply dry-erase marker ink to said interactive surface.

5. The interactive board of claim 4, wherein each pen tool is configured to provide illumination when applying dry-erase marker ink to said interactive surface.

6. The interactive board of claim 4, further comprising a tool tray for supporting each pen tool.

7. The interactive board of claim 1, wherein said processing structure is configured to send said digital ink to a printer for printing, to a USB storage device for storage, or to both in response to selection of said at least one user selectable element.

8. The interactive board of claim 1, further comprising a control bar, said control bar comprising a plurality of user selectable elements, each user selectable element being associated with a different function.

9. The interactive board of claim 8, wherein said user selectable elements are associated with power, printing, storage and data transmission functions.

10. The interactive board of claim 8, wherein said control bar is located on said interactive surface or on frame structure surrounding said interactive surface.

11. The interactive board of claim 1, wherein said processing structure is configured to communicate with one or more wireless computing devices over a wireless communication session.

12. The interactive board of claim 11, wherein said processing structure is configured, during the wireless communication session, to automatically send digital ink to one or more wireless computing devices.

13. The interactive board of claim 12, wherein said processing structure is configured, during the wireless communication session, to continuously send digital ink to one or more wireless computing devices.

14. The interactive board of claim 11, further comprising at least one of a quick response (QR) code label and a near field communication (NFC) label encoding wireless link information.

15. The interactive board of claim 14, wherein the wireless link information is usable by each wireless computing device for establishing the wireless communication session with the processing structure.

16. An interactive input system comprising the interactive board according to claim 11 and one or more wireless communication devices in communication with the interactive board over a wireless communication session.

17. The interactive input system of claim 16, wherein said processing structure is configured, during the wireless communication session, to automatically send digital ink to one or more wireless computing devices.

18. The interactive input system of claim 17, wherein said processing structure is configured, during the wireless communication session, to continuously send digital ink to one or more wireless computing devices.

19. The interactive input system of claim 16, wherein at least one of said one or more wireless computing devices is configured to forward digital ink to at least one of a networked device and a cloud storage service.

20. The interactive input system of claim 16, wherein at least one of said one or more wireless computing devices is configured to automatically send digital ink at periodic intervals to said networked device, to said cloud storage service, or to both.

21. A non-transitory computer-readable medium storing instructions which, when executed by one or more processors, cause an interactive board at least to:

process data received from at least one operation cycle of at least one imaging device to locate at least one pointer positioned in proximity with an interactive surface, wherein the operation cycle includes a first image frame captured with at least one illumination source of the interactive board turned on and a second image frame captured with the at least one illumination source of the interactive board turned off;

update digital ink according to pointer location by:
generating, after detecting illumination provided by the at least one pointer at the pointer location within the second image frame, digital ink corresponding to the pointer location; and erasing, after detecting no illumination provided by the at least one pointer at the pointer location within the first image frame, digital ink corresponding to the pointer location; and when a user selectable element of said interactive board is selected, send said digital ink to one or more devices in communication with the interactive board.

22. A wireless computing device comprising memory storing instructions and one or more processors communicating with the memory and executing the instructions to cause the wireless computing device at least to:

process information on an interactive board to obtain wireless link information;

establish a wireless communication session with the interactive board using the wireless link information; and display digital ink received from said interactive board over said wireless communication session on a display, wherein updates to the digital ink are transmitted during said wireless communication session, the updates including:

generating digital ink corresponding to a pointer location after detecting illumination provided by a pointer at the pointer location within a first image frame of an operation cycle of at least one image device captured with at least one illumination source of the interactive board in a first state; and erasing digital ink corresponding to the pointer location after detecting no illumination provided by the pointer at the pointer location within a second image frame of the operation cycle of the at least one imaging device captured with the at least one illumination source of the interactive board in a second state.

23. The wireless computing device of claim 22, wherein the information is at least a near field communication (NFC) label on the interactive board.

24. The wireless computing device of claim 22, wherein—
the information is at least a near field communication (NFC) label that encodes:
an uniform resource locator (URL) comprising a Wi-Fi MAC address and a Bluetooth MAC address of a general purpose computing device connected to the interactive board, and
a hypertext transfer protocol (HTTP) address for a webpage that prompts the user to download and install a wireless communication application;
the processing is done automatically using an NFC communication application that decodes the URL when the wireless computing device is in proximity with the NFC label; and
the establishing includes:
if a wireless communication application is installed on the wireless computing device, launching the wireless communication application,
if the wireless communication application is not installed on the wireless computing device, directing the wireless computing device to open a browser window displaying the webpage corresponding to the HTTP address encoded in the NFC label, and
directing the wireless computing device to establish a wireless communication session with the general purpose computing device using the wireless link information.

25. The wireless computing device of claim 24, wherein the wireless communication application includes:
an optical character recognition (OCR) engine that is configured to convert digital ink recognized as text to digital text; and
a function menu having—
a save function selectable element that, when selected, causes the wireless computing device to save at least one of digital ink and digital text as a digital ink file,
an email function selectable element that, when selected, causes the wireless computing device to send the digital ink file in an email to one or more specified email addresses,
an automatic cloud storage function selectable element that, when enabled, causes the wireless computing device to automatically send the digital ink file at period time intervals to an address of a cloud storage system for storage, and
an automatic networked device forward function that, when enabled, causes the wireless computing device to automatically send the digital ink file at period time intervals to a network address of a network device for at least one of viewing and storage.

* * * * *